Dec. 27, 1938.   C. FERGUSON   2,141,646
DEVICE FOR DETECTING ETHYL ALCOHOL
Filed March 10, 1936
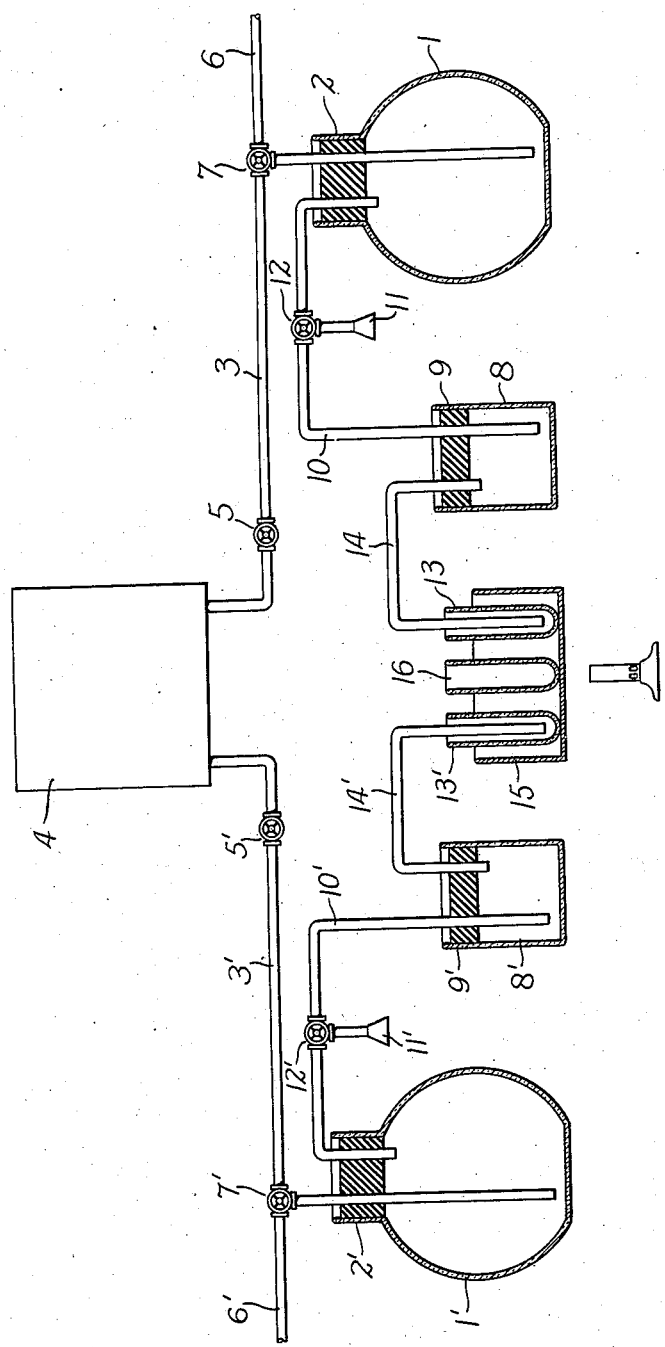
INVENTOR
Charles Ferguson
BY
Daniel L. Morris
ATTORNEY Patented Dec. 27, 1938

2,141,646

UNITED STATES PATENT OFFICE 2,141,646

DEVICE FOR DETECTING ETHYL ALCOHOL

Charles Ferguson, Elizabeth, N. J.

Application March 10, 1936, Serial No. 68,038

1 Claim. (Cl. 23—253)

This invention relates to a device for testing a gas for the presence of ethyl alcohol and for indicating such presence.

Specifically, the device is useful in testing for and indicating the presence of ethyl alcohol on the breath of persons suspected of being intoxicated.

The principal object of the invention is to provide such a device that may be used by one having no knowledge of chemistry and that will indicate, visually, the presence of ethyl alcohol.

In the drawing, the figure is a diagrammatic representation of the invention.

The device consists essentially of a control side and a testing side, one being a duplicate of the other.

I shall therefore describe the testing side and apply the same reference characters, but primed, to the corresponding elements on the control side.

The device includes a flask 1—1' the mouth of which is closed by a stopper 2—2'. A pipe 3—3' leads from a water reservoir 4 through the stopper 2—2' to a point within and adjacent the bottom of the flask 1—1'. This pipe has a shut-off valve 5—5' interpolated therein and is provided with a waste water outlet 6—6'. At the junction of this outlet 6—6' a two-way valve 7—7' is located so that the water from the reservoir 4—4' may be directed to the flask or the water from the flask may be directed through the outlet 6—6' to the atmosphere.

A filter jar 8—8' which is closed by a stopper 9—9' is filled with a filtering solution such as Scott-Wilson solution which is constituted by mercuric cyanide 10 grams, sodium hydroxide 180 grams, and 1200 cc. of water to which has been added 400 cc. of 0.7268 percent solution of silver nitrate. A pipe 10—10' extends from the bottom of the jar 8—8' through the stopper 9—9' and into the flask 1—1', terminating adjacent the top of the flask.

A mouthpiece or vent 11—11' is interpolated in the pipe 10—10' and its communication with the flask 1—1' or the jar 8—8' is selectively controlled by a two-way valve 12—12'.

The top of the jar 8—8' communicates with a test tube 13—13' through a pipe 14—14' which extends into the test tube to a point adjacent its bottom. This test tube contains a testing reagent such as potassium bichromate 0.333 gram, sulphuric acid 50 cc. and water 50 cc.

It must be realized that the quantities and proportions of the constituents of the filtering and testing solutions may be varied within permissible limits.

The test tube 13 is located in a warm bath 15—15' which may be maintained at a proper temperature by a Bunsen burner.

An additional test tube 16 is located in the bath 15—15' and contains a quantity of the same testing solution as is in the tube 13—13'.

In operation the flask 1 is filled or partly filled with a measured quantity of water from the reservoir 4, the valve 7 being set to permit the necessary flow. The valve 7 is then shifted to place the flask 1 in communication with the atmosphere through the waste pipe 6. The gas to be tested for ethyl alcohol is then forced through the mouthpiece 11 into the flask 1, the valve 12 being set to establish communication between the mouthpiece and the flask. The gas entering the flask 1 forces the water from the flask through the waste pipe 6.

The valve 12 is then set to establish communication between the flask 1 and the jar 8 through the pipe 12. The valve 7 is then set to permit water to enter the flask 1, and entering the water forces the gas into the filtering solution in the jar 8. The filtered gas, with such extraneous gases as ammonia and acetone removed by the filtering solution, passes into the test tube 13 and into the testing and indicating solution therein. This solution is normally yellow in color but in the presence of ethyl alcohol turns to blue.

Thus the presence of ethyl alcohol in the gas being tested is checked and indicated.

The control side of the apparatus may be simultaneously or subsequently operated with a gas known to contain no alcohol to check the accuracy of the analysis and, if desired, a solution known to contain alcohol may be dropped into the testing solution in the tube 16, thus testing the accuracy of the testing solution.

What I claim is:

In an apparatus for use in determining and indicating the presence of ethyl alcohol in exhaled human breath, a reservoir adapted to contain water, a closed flask adapted to receive water from the reservoir, a closed jar adapted to contain an acetone absorbing solution, a tube adapted to contain a solution for indicating the presence of ethyl alcohol, piping leading from the reservoir to the bottom of the flask, from the top of the flask to the bottom of the jar, and from the top of the jar to the tube a two way valve between the reservoir and the flask to establish communication between the reservoir and the flask or between the flask and the atmosphere, a two way valve between the flask and the jar to establish communication between the two or between the flask and the source of supply of the exhaled breath, a second closed flask, jar, and tube, each of equal capacity with the first mentioned flask, jar and tube respectively, piping connecting the reservoir with the flask, the flask with a jar, and the jar with a tube, and means for maintaining an equal temperature in said tubes.

CHARLES FERGUSON.